(12) United States Patent
Sharma et al.

(10) Patent No.: US 12,289,748 B2
(45) Date of Patent: Apr. 29, 2025

(54) METHODS AND SYSTEMS FOR ALLOCATION OF CONTENTION BASED DATA TRANSMISSION RESOURCES IN A NON-TERRESTRIAL NETWORK

(71) Applicant: SAMSUNG ELECTRONICS CO., LTD., Suwon-si (KR)

(72) Inventors: Neha Sharma, Bangalore (IN); Vikalp Mandawaria, Bangalore (IN); Seungil Park, Suwon-si (KR); Jungsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 415 days.

(21) Appl. No.: 17/845,255

(22) Filed: Jun. 21, 2022

(65) Prior Publication Data

US 2022/0408454 A1    Dec. 22, 2022

(30) Foreign Application Priority Data

Jun. 21, 2021   (IN) .............................. 202141027804
Jun. 8, 2022   (IN) .............................. 2021 41027804

(51) Int. Cl.
*H04W 72/04*   (2023.01)
*H04L 5/00*   (2006.01)
(Continued)

(52) U.S. Cl.
CPC ............ *H04W 72/54* (2023.01); *H04L 5/0098* (2013.01); *H04W 72/23* (2023.01); *H04W 84/06* (2013.01)

(58) Field of Classification Search
CPC . H04W 72/54; H04W 72/23; H04W 72/0053; H04W 84/06; H04W 74/02; H04L 5/0098; H04B 7/18504; H04B 7/18513
See application file for complete search history.

(56) References Cited

U.S. PATENT DOCUMENTS

2004/0022219 A1   2/2004   Mangold et al.
2008/0318607 A1*  12/2008  Torsner ............ H04W 74/0816
                                              455/509
(Continued)

FOREIGN PATENT DOCUMENTS

WO     2008/148358     12/2008

OTHER PUBLICATIONS

ETSI TS 138 321 V16.4.0 (Apr. 2021); 5G; NR; Medium Access Control (MAC) protocol specification (3GPP TS 38.321 version 16.4.0 Release 16 (Year: 2021).*
(Continued)

*Primary Examiner* — Mahbubul Bar Chowdhury
(74) *Attorney, Agent, or Firm* — NIXON & VANDERHYE P.C.

(57) ABSTRACT

The present disclosure provides methods and systems for allocation of contention based data transmission (CBDT) resource blocks in a non-terrestrial network. The method comprises: determining if the CBDT resource blocks are to be configured for allocation to a plurality of user equipments (UEs) based on at least one of a plurality of parameters. The method comprises determining if a fixed number of CBDT resource blocks from the CBDT resource blocks are to be used for the allocation based on the determination using at least one of the plurality of parameters. The method comprises allocating a number of CBDT resource blocks in one of a fixed manner or a dynamic manner, wherein the number of CBDT resource blocks are allocated in the fixed manner, based on the fixed numbers of CBDT resource blocks being used for the allocation, and the number of CBDT resource blocks are allocated in the dynamic manner, based on the fixed numbers of CBDT resource blocks not being used for the allocation.

18 Claims, 7 Drawing Sheets

(51) Int. Cl.
*H04W 72/23* (2023.01)
*H04W 72/54* (2023.01)
*H04W 84/06* (2009.01)

(56) References Cited

U.S. PATENT DOCUMENTS

| | | | |
|---|---|---|---|
| 2012/0044877 A1* | 2/2012 | Ratasuk | H04W 74/08 |
| | | | 370/329 |
| 2012/0182977 A1* | 7/2012 | Hooli | H04W 72/20 |
| | | | 370/336 |
| 2017/0013610 A1* | 1/2017 | Lee | H04W 72/21 |
| 2017/0223735 A1* | 8/2017 | Damnjanovic | H04W 72/21 |
| 2018/0160443 A1* | 6/2018 | Tang | H04L 27/2613 |
| 2018/0270803 A1* | 9/2018 | Kwak | H04W 74/08 |
| 2020/0008220 A1* | 1/2020 | Lee | H04W 74/02 |
| 2020/0015249 A1* | 1/2020 | Li | H04W 72/21 |
| 2021/0212114 A1* | 7/2021 | Chen | H04W 74/0816 |
| 2021/0368534 A1* | 11/2021 | Sato | H04W 72/569 |

OTHER PUBLICATIONS

Indian Office Action issued Jan. 24, 2023 in corresponding Indian Patent Application No. 202141027804.

* cited by examiner

METHODS AND SYSTEMS FOR ALLOCATION OF CONTENTION BASED DATA TRANSMISSION RESOURCES IN A NON-TERRESTRIAL NETWORK

CROSS REFERENCE TO RELATED APPLICATIONS

This application is based on and claims priority under 35 U.S.C. § 119 to Indian Provisional Patent Application Serial No. 202141027804 (PS), filed on Jun. 21, 2021, in the Indian Patent Office, and to Indian Complete Patent Application Serial No. 202141027804 (CS), filed on Jun. 8, 2022, in the Indian Patent Office, the disclosures of all of which are incorporated herein by reference in their entireties.

BACKGROUND

Field

The disclosure relates to wireless communication and for example, relates to the methods and systems for allocation of contention based data transmission (CBDT) resource blocks in a non-terrestrial network (NTN).

Description of Related Art

In recent years, several broadband wireless technologies such as second to fifth generation wireless communication systems have been developed for providing better applications and services to meet growing requirements of broadband subscribers. Recently, sixth generation of wireless communication system (6G) has been developed to provide higher data connectivity and faster services. For 6G, various technologies have been under consideration, for example, visible light communication (VLC), terahertz band (THz) e.g., frequencies from 100 GHz to 3 THz, Infrared wave, and ultraviolet wave, etc. Among all the technologies, the THz band is envisioned as a potential technology for a diverse range of applications, which exist within the nano, micro as well as macro scales. The various features of THz band are such as that it provides terabits per second (Tbps) data rates, reliable transmission, and minimal latency.

One of the key features of 6G is to promote ubiquitous and high-capacity global connectivity. Non-terrestrial network (NTN) can provide high-capacity connectivity in future 6th generation (6G) wireless networks. NTNs are expected to foster the roll out of 6G/beyond $5^{th}$ generation (B5G) service in un-served areas that cannot be covered by terrestrial network (isolated/remote areas, on board aircrafts or vessels) and underserved areas (e.g., sub-urban/rural areas) to upgrade the performance of limited terrestrial networks in cost effective manner FIG. 1 illustrates a non-terrestrial network providing access to user equipment, in accordance with existing art.

A non-terrestrial network refers to a network, or segment of networks using radio frequency (RF) resources on board of a satellite or unmanned aerial system (UAS) platform. NTN includes spaceborne as well as airborne network. The spaceborne network consist of geostationary or geosynchronous orbit (GEO) satellite, medium earth orbit (MEO) satellite and low earth orbit (LEO) satellite. The airborne network is based on UAS including high altitude platform station (HAPS). As per TR 38.821, NTN typically features one or several satellite-gateways that connect the NTN to a public data network. As shown in FIG. 1, the satellite or UAS platform is fed by one or more satellite-gateways which are deployed across satellite targeted coverage area (e.g., regional, or even continental coverage area). Usually, a user equipment (UE) in a cell is served by only one satellite-gateway. A satellite in NTN is served successively by one or several sat-gateways at a time. The NTN ensures service and feeder link continuity between the successive serving sat-gateways with sufficient time duration to proceed with mobility anchoring and hand-over. As shown in FIG. 1, a feeder link is a link between a satellite-gateway and the satellite or UAS platform. A service link is a link between the user equipment and the satellite or UAS platform. The satellite or UAS platform may implement either a transparent or a regenerative (with on board processing) payload. The transparent payload has radio frequency filtering, frequency conversion and amplification. Hence, the waveform signal repeated by the payload is un-changed. The regenerative payload has radio frequency filtering, frequency conversion and amplification as well as demodulation/decoding, switch and/or routing, coding/modulation. This is effectively equivalent to having all or part of base station functions (e.g., gNB) on board the satellite or UAS platform. The satellite or UAS platform generates beams typically generate several beams over a given service area bounded by its field of view. The footprints of the beams are typically of elliptic shape. The field of view of a satellite or UAS platform depends on the on-board antenna diagram and minimum elevation angle of the antenna. The UE is served by the satellite or UAS platform within a targeted service area. There may be several types of satellites (or UAS platforms) as listed here in Table 1:

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position | 200-3500 km |
| UAS platform (including HAPS) | 8-50 km (20 km for HAPS) | fixed in terms of elevation/azimuth with respect to a given earth point | 5-200 km |
| High Elliptical Orbit (HEO) satellite | 400-50000 km | Elliptical around the earth | 200-3500 km |

However, propagation delays or maximum round trip delay in NTN are longer, ranging from several milliseconds to hundreds of milliseconds depending on the altitudes of the spaceborne or airborne platforms and payload type in NTN. The propagation delays or maximum round trip delay is amount of time; a signal takes to travel from a sender to a receiver. Table 2 below shows example propagation delays in the network:

TABLE 2

| NTN scenarios | A<br>GEO<br>transparent<br>payload | B<br>GEO<br>regenerative<br>payload | C1<br>LEO transparent<br>payload | C2 | D1<br>LEO regenerative<br>payload | D2 |
|---|---|---|---|---|---|---|
| Satellite altitude | 35786 km | | 600 km | | | |
| Relative speed of Satellite with respect to earth | negligible | | 7.56 km per second | | | |
| Min elevation for both feeder and service links | 10° for service link and 10° for feeder link | | | | | |
| Typical Min/Max NTN beam foot print diameter (note 1) | 100 km/3500 km | | 50 km/1000 km | | | |
| Maximum propagation delay contribution to the Round Trip Delay on the radio interface between the gNB and the UE | 541.46 m (Worst case) | 270.73 ms | 25.77 ms | | 12.89 ms | |
| Minimum propagation delay contribution to the Round Trip Delay on the radio interface between the gNB and the UE | 477.48 ms | 238.74 ms | 8 ms | | 4 ms | |

Dealing with such long propagation delays requires modifications of many timing aspects in NTN from physical layer to higher layers, including timing advance (TA) mechanism, measurement, channel quality indicator (CQI), Hybrid automatic repeat request (HARQ) procedure, scheduling, etc.

FIG. 2 is a diagram illustrating scheduling of UE transmission in non-terrestrial network, in accordance with existing art. As per TR 38.821 a typical procedure when data arrives in a buffer is to trigger a buffer status report (BSR) and if the UE does not have any uplink resources for transmitting the BSR, the UE will go on to do a Scheduling Request to ask for resources. Since the scheduling request is only an indication telling the network that the UE requires scheduling, the network will not know the full extent of the resources required to schedule the UE. Thus, initially, the network typically schedules the UE with a grant large enough to send a BSR so that the network may schedule the UE more accordingly, as shown in FIG. 2. In NTN, the drawback of this procedure is that it would take at least 2 round-trip times from data arriving in the buffer at the UE side until it can be properly scheduled with resources that would fit the data and the required quality of service (QoS). Due to the large propagation delays in NTN, this becomes prohibitively large. The large propagation delay further increases the scheduling delay which impacts the user experience.

One of the possible solutions to reduce the scheduling delay to share the resources in advance with the UE. Few schemes like semi-persistent scheduling (SPS) scheduling, Grant free allocation is there which provides dedicated grants to the UE. These existing mechanisms are efficient when there is continuous generation of data like voice or volte services or grant free allocation where grants have been reserved helpful for ultra-reliable low latency communications (URLLC) kind of service which are time critical. However, existing mechanisms are not efficient for applications like video, internet of things (IoT), internet kind of service as there is no periodicity of such data. Moreover, these mechanisms impact the network resource allocation as network has to provide dedicated grants to the UE. Hence, there is need to introduce mechanism where such large propagation delay can be addressed and new efficient resource mechanism is introduced which can helps to improve the user experience.

SUMMARY

In an example embodiment, the present disclosure provides a method for allocation of contention based data transmission (CBDT) resource blocks in a non-terrestrial network (NTN). The method comprises: determining if the CBDT resource blocks are to be configured for allocation to a plurality of user equipments (UEs) based on at least one of a plurality of parameters; determining a fixed number of CBDT resource blocks from the CBDT resource blocks are to be used for the allocation based on the determination using at least one of the plurality of parameters; allocating a number of CBDT resource blocks in one of a fixed manner or a dynamic manner, wherein the number of CBDT resource blocks are allocated in the fixed manner, based on the fixed numbers of CBDT resource blocks being used for the allocation, and the number of CBDT resource blocks are allocated in the dynamic manner, based on the fixed numbers of CBDT resource blocks not being used for the allocation.

In an example embodiment, a method for transmitting data using contention based data transmission (CBDT) resource blocks in a non-terrestrial network (NTN), is disclosed. The method comprises: receiving a number of CBDT resource blocks and calculating a slot/symbol where a user equipment (UE) use the CBDT resource blocks such that the calculated symbol/slot is aligned with a scheduling request (SR); accessing the CBDT resource blocks that are valid in the calculated slot/symbol and determining if the valid CBDT resource blocks are available in the calculated slot/symbol; and transmitting the data along with the SR using the valid CBDT resource blocks based on the determination.

In an example embodiment, a system for allocation of contention based data transmission (CBDT) resource blocks in a non-terrestrial network (NTN), is disclosed. The system comprises: a memory and a processor coupled to the memory. The processor is configured to: determine if the CBDT resource blocks are to be configured for allocation to a plurality of user equipments (UEs) based on at least one of a plurality of parameters, determine if a fixed number of CBDT resource blocks from the CBDT resource blocks are to be used for the allocation based on the determination and using at least one of the plurality of parameters, and allocate a number of CBDT resource blocks in one of a fixed manner or a dynamic manner, wherein the number of CBDT resource blocks are allocated in the fixed manner, based on the fixed numbers of CBDT resource blocks being used for the allocation, and the number of CBDT resource blocks are allocated in the dynamic manner, based on the fixed numbers of CBDT resource blocks not being used for the allocation.

In an example embodiment, a system for transmitting data using contention based data transmission (CBDT) resource blocks in a non-terrestrial network (NTN), is disclosed. The system comprises: a memory and a processor coupled to the memory. The processor is configured to: receive a number of CBDT resource blocks, calculate a slot/symbol where a user equipment (UE) use the CBDT resource blocks such that the calculated symbol/slot is aligned with a scheduling request (SR), access the CBDT resource blocks that are valid in the calculated slot/symbol, determine if the valid CBDT resource blocks are available in the calculated slot/symbol, and transmit the data along with the SR using the valid CBDT resource blocks based on the determination.

To further illustrate the advantages and features of the present disclosure, a more particular description will be rendered by reference to various example embodiments thereof, which is illustrated in the appended drawings. It is appreciated that these drawings depict only example embodiments of the disclosure and are therefore not to be considered limiting its scope. The disclosure will be described and explained with additional specificity and detail with reference to the accompanying drawings.

BRIEF DESCRIPTION OF THE DRAWINGS

The above and other aspects, features, and advantages of certain embodiments of the present disclosure will be more apparent from the following detailed description, taken in conjunction with the accompanying drawings, wherein like characters represent like parts throughout the drawings, and in which.

Figure 1:
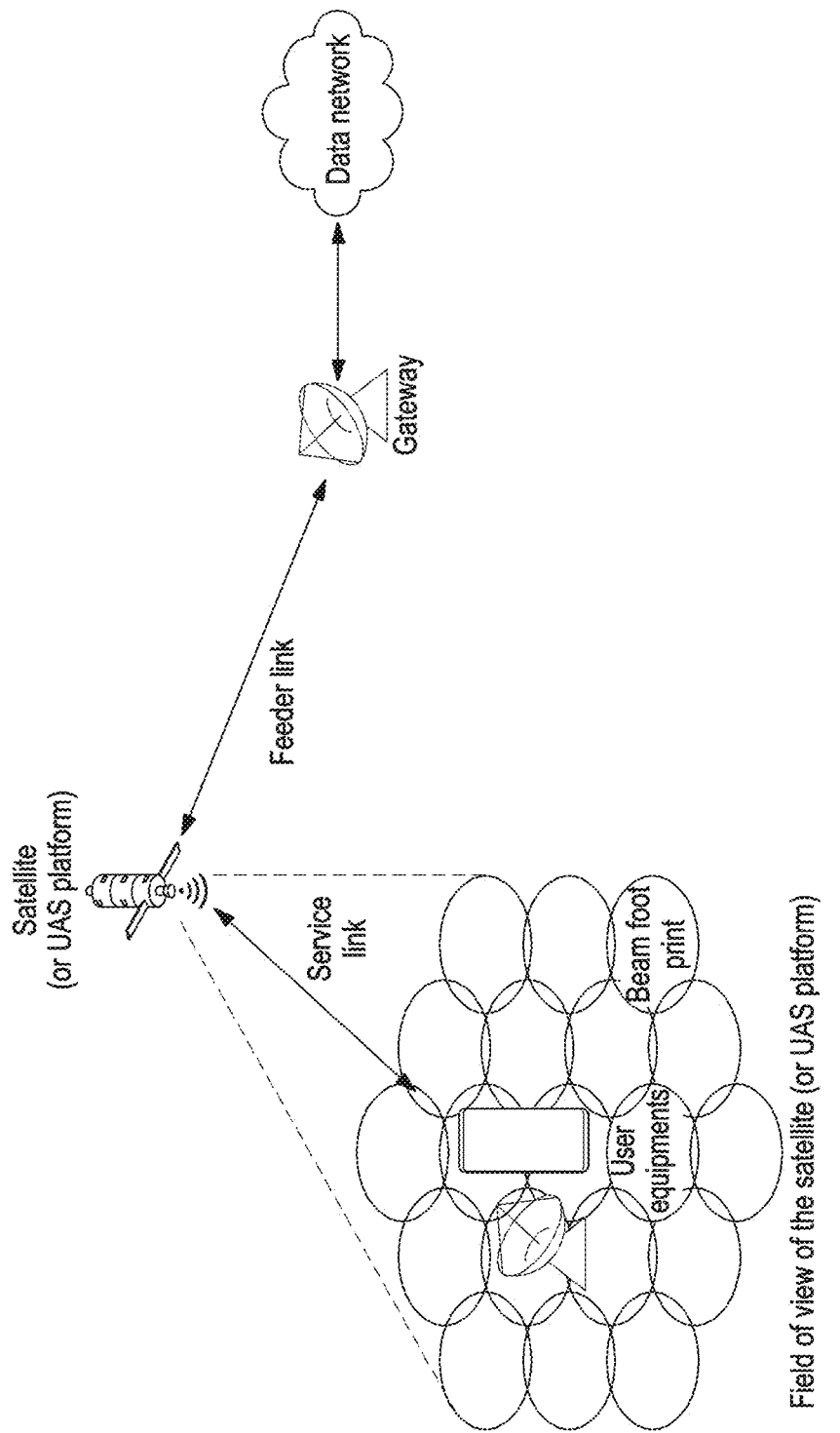
FIG. 1 is a diagram illustrating a non-terrestrial network providing access to user equipment, in accordance with existing art.
Figure 2:
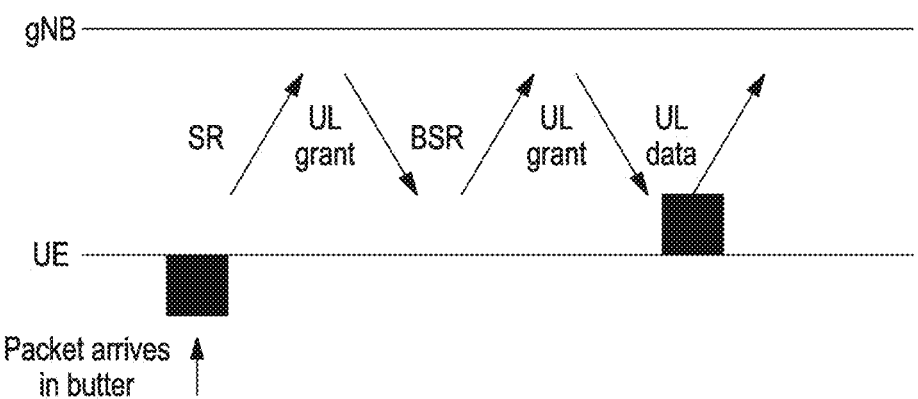
FIG. 2 is a diagram illustrating scheduling of UE transmission in non-terrestrial network, in accordance with existing art.

Further, skilled artisans will appreciate that elements in the drawings are illustrated for simplicity and may not have necessarily been drawn to scale. For example, the flowcharts illustrate the method in terms of operations involved to help to improve understanding of aspects of the present disclosure. Furthermore, in terms of the construction of the device, one or more components of the device may have been represented in the drawings by conventional symbols, and the drawings may show those specific details that are pertinent to understanding the various example embodiments of the present disclosure so as not to obscure the drawings with details that may be readily apparent to those of ordinary skill in the art.

DETAILED DESCRIPTION

It should be understood at the outset that although illustrative implementations of the various example embodiments of the present disclosure are illustrated below, the present disclosure may be implemented using any number of techniques, whether currently known or in existence. The present disclosure should in no way be limited to the illustrative implementations, drawings, and techniques illustrated below, including the example design and implementation illustrated and described herein, but may be modified within the scope of the appended claims along with their full scope of equivalents.

The term "some" as used herein may include "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" may include "no embodiment, or one embodiment, or more than one embodiment, or all embodiments."

The terminology and structure employed herein is for describing, teaching, and illuminating various embodiments and their specific features and elements and does not limit, restrict, or reduce the spirit and scope of the claims or their equivalents.

For example, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated.

Whether or not a certain feature or element was limited to being used only once, either way it may still be referred to as "one or more features" or "one or more elements" or "at least one feature" or "at least one element." Furthermore, the use of the terms "one or more" or "at least one" feature or element do not preclude there being none of that feature or element, unless otherwise specified.

Unless otherwise defined, all terms, and especially any technical and/or scientific terms, used herein may be taken to have the same meaning as commonly understood by one having an ordinary skill in the art.

It should be noted that the terms "resource(s)" and "resource block(s)" have been interchangeably used throughout the disclosure.

Embodiments of the present disclosure will be described in greater detail below with reference to the accompanying drawings.

Figure 3:
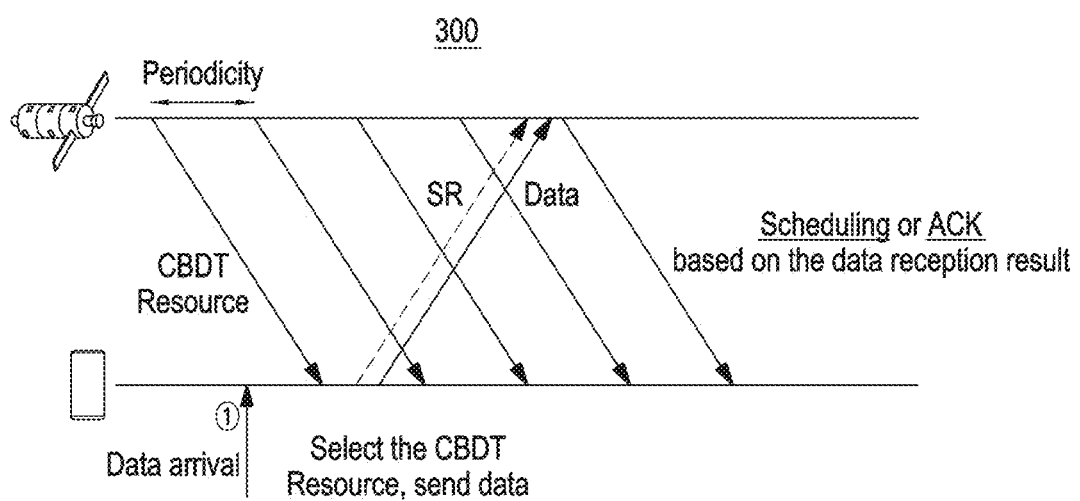
FIG. 3 is a diagram illustrating scheduling of a contention-based grants to the UE, in accordance with existing art.

A contention based data transmission (CBDT) is used where few physical resource or grants can be reserved by the network for data transmission and shared with a plurality of user equipment (UE). These resources can be used by any of the plurality of UE, as required by the UE. However, if multiple UEs try to use the same set of resources, then contention can happen at the network. An example of such scheduling is shown in FIG. 3. FIG. 3 is a diagram illustrating scheduling of contention-based grants to the UE, in accordance with existing art.

As shown in FIG. 3, the network gives the contention-based grants to the UE, which are shared resource blocks. When any of the plurality of UE has data, the UE can first check whether any CBDT related resource blocks (RB) are available. IF CBDT resources are available, then the UE selects these resources and send data. The UE also sends scheduling request (SR) to the network using the CBDT resource blocks. The SR is required in case contention happens at the network. In such scenario, the network can send the grants to send the BSR. Once the network receives SR, the network checks whether any contention happen or not, as multiple UEs may use the same set of resources. If there is no contention, then then the network can send acknowledgement (ACK) to the UE. However, if there is contention, that is, multiple UEs try to use same resources, then the network should send the grants to UE so that it can send the BSR (Buffer status report). In case, any contention happened then existing scheduling procedure is followed, where first UE sends the BSR and then once the network receives the BSR, the network allocates the grants to the UE to send the data.

The network should also provide location of contention-based resources (Data/Control), guide to use contention-based resources, self-scheduling information for data or BSR (if there is more data to transmit) as part of a control information to the UE. The UE also needs to inform the network what all resources the UE has to use for data transmission. However, there is need to change or enhance protocol design to manage various procedures like allocation of the CBDT resources, indication to the UE and new parameters and procedures to handle the same. Thus, the CBDT scheme needs to be further defined for efficient resource mechanism. The CBDT scheme is based on shared resource mechanism. There is need to reserve certain physical resources for this scheme for data transmission so there is need to design the resource allocation in CBDT to avoid any issues in normal scheduling procedure. The network has set of resources which depends on various factors such as numbers of UE, bandwidth and frequency of network etc. One RB contains 12 consecutive sub-carriers in frequency domain. These resource blocks can be further assigned to each UE depending on capability of the UE and quality of service (QoS) requirement. The network while allocating the CBDT resources has to ensure that the current operation should not get impacted. Hence, there is need to define mechanism through which number of resources can be calculated for contention based data transmission. Accordingly, the present disclosure discloses techniques for allocation of CBDT resource blocks.

Figure 4:
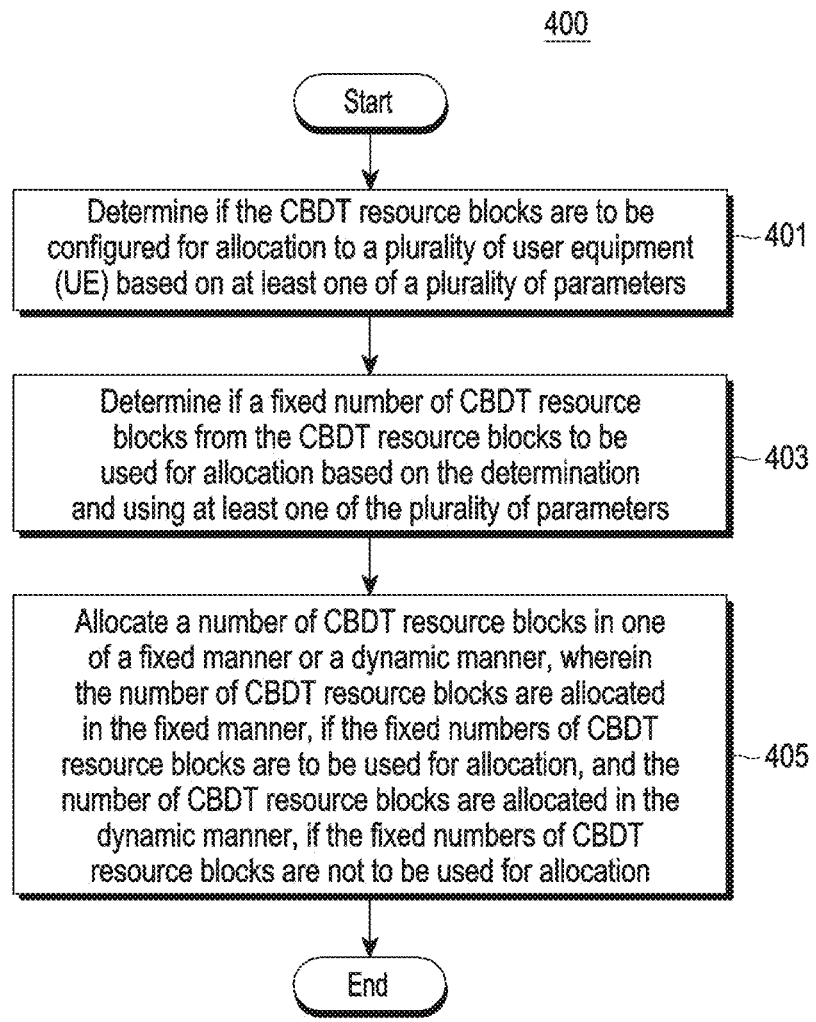
FIG. 4 is a flowchart illustrating an example method for allocation of CBDT resource blocks in a non-terrestrial network (NTN), according to various embodiment.

FIG. 4 is a flowchart illustrating an example method for allocation of CBDT resource blocks in NTN, according to various embodiments.

At operation 401, the method 400 may include determining if the CBDT resource blocks are to be configured for allocation to a plurality of UE based on at least one of a plurality of parameters. In an embodiment, the plurality of parameters may include number of configured UE, UE traffic model, latency, QoS requirements, processing capability at gnodeB (gNB), load at gNB etc. For example, if the UE traffic model has traffic like IoT, Volte, Video, then it may be determined that CBDT resource blocks are to be configured for allocation. Similarly, the network has to ensure that allocation of CBDT resources do not impact the ongoing services of the UE. High QoS requires dedicated resources only. Hence, if there is high QoS requirement then it may be determined that CBDT resource blocks are not to be configured for allocation. In an embodiment, the network may receive the QoS requirement from the UEs. Further, the network may decide whether QoS requirement is high or low using the known methods.

At operation 403, the method 400 may include determining if a fixed number of CBDT resource blocks from the CBDT resource blocks to be used for allocation based on the determination and using at least one of the plurality of parameters. As discussed in reference to step 401, the plurality of parameters may include number of configured UE, UE traffic model, latency, QoS requirements, processing capability at gNB, load at gNB etc. For example, if UE traffic model has traffic like IoT, Volte, Video, and a major portion of configured UEs have this type of traffic model, then it may be determined that a fixed number of CBDT resource blocks from the CBDT resource blocks shall be used for allocation, as the more UE may require CBDT resource blocks.

At operation 405, the method may include allocating a number of CBDT resource blocks in one of a fixed manner or a dynamic manner. For example, at operation 403, if it is determined that the fixed numbers of CBDT resource blocks are to be used for allocation, then number of CBDT resource blocks are allocated in the fixed manner. However, if it is determined that fixed numbers of CBDT resource blocks are not to be used for allocation, then the number of CBDT resource blocks are allocated in the dynamic manner.

If the number of CBDT resource blocks are to be allocated in the fixed manner, then the number of CBDT resource blocks may be calculated based on at least one of a plurality of predefined parameters. The plurality of predefined parameters may include the plurality of user equipment configured with the NTN network, type of application used by the plurality of user equipment, a ratio of ACK/non-acknowledgement (NACK) of previously allocated resource blocks to the plurality of user equipment, utilization of resource blocks by the plurality of user equipment, a signal strength of plurality of user equipment and quality of QoS of the plurality of user equipment. For example, the network needs to reserve the CBDT resources based on number of configured UEs, e.g., number of user equipment configured with the NTN network. All configured UEs may or may not need the access to these CBDT resources. High priority UEs or UEs which are subscribed for special services such as IoT, video etc. can have access to these CBDT resources. Similarly, few type of traffic/application used by the UE, such as IoT, Volte, Video can have access to such CBDT resources. The network can calculate the number of CBDT resources based on how many UEs are using these specific application. Further, CBDT resources are shared resources and allocation of these resources can depends upon the contention or HARQ ACK/NACK ratio of previously allocated resource blocks to the plurality of user equipment. If this error ratio is above a predefined threshold or contention is the pre-defined threshold, then the network may reduce the number of CBDT resources. Else, the network may increase the number of CBDT resources. The predefined threshold may be configured by the network.

The UEs may or may not be using the CBDT resources depending on type of application or data rate. In that case, if these resources are not fully utilized or underutilized, then the network may reduce the number of CBDT resources. Similarly, if these resources are utilized by most of the UEs, then the network may increase the number of CBDT resources.

In an embodiment, the number of CBDT resources may be calculated based on signal strength of plurality of user equipment. This is one of important parameters, where based on zones or beams, the network may consider configuring the CBDT resources or not. Poor signal strength may yield to poor performance. Hence, in case of poor signal strength, e.g., signal strength of the UEs is below a signal threshold, the network may reduce the number of CBDT resources. However, if the signal strength of the UEs is above the signal threshold, then the network may increase the number of CBDT resources. The signal threshold may be configured by the network.

The QoS is also an important parameter to consider while calculating the number of CBDT resource. In particular, the network has to ensure that allocation of CBDT resources do not impact the ongoing services of the UE. High QoS requires dedicated resources only. Hence, if there is high QoS requirement then the network may reduce the number of CBDT resources. However, if there is low QoS requirement then the network may increase the number of CBDT resources. Hence, the network should only reserve the resources which do not impact the ongoing service of the UEs. In an embodiment, the network may receive the QoS requirement from the UEs. Further, the network may decide whether QoS requirement is high or low using the known methods.

The network can use any one of the predefined parameters or combination of multiple parameters to calculate the number of CBDT resource blocks. As an example, one of criteria could be based on number of configured UEs using specific application and ACK/NACK ratio. In this example, number of resources required that satisfy the QOS for configured UEs is calculated. Let us assume that N UEs satisfying the QoS criteria e.g., the QoS of N UEs is above a predetermined threshold, and the ACK/NACK ratio of these UEs is above the predefined threshold. The predetermined threshold may be configured by the network.

If the application type is set as "X." X could be any application which needs to access these resources. Let us assume that M UEs out of N UEs are configured with "X" application. Then, the CBDT resources may be calculated for M UEs. However, if none of the UE out of N UEs is configured with "X" application, then number of CBDT resources may be calculated as:

Fixed number of CBDT RBs=Total resources−Re-
sources required for N UEs satisfying the QOS
criteria.

These resources can be semi static resources which can be configured by a radio resource control (RRC) message or any other message and this can be changed based on addition, deletion of UEs, requirement of application, QOS requirement and other criteria as mentioned above.

In an embodiment, a machine learning/artificial intelligence (ML/AI) model may be used to calculate the number of CBDT resources. In particular, all the predefined parameters may be used by the AI/ML model to calculate the number of CBDT resources and whether it is needed to increase or decrease the CBDT resources.

Referring back to operation 405, if the number of CBDT resource blocks are to be allocated in the dynamic manner, the number of CBDT resource blocks may be calculated based on total number of resource blocks and scheduled resource blocks, wherein the scheduled resource blocks include dedicated resource blocks, common resource blocks and shared resource blocks for configured and control channel Hence, in dynamic manner, the network determines how many RBs were not scheduled for any data. These RBs are the resources which are not part of any dedicated, shared or common resources for data as well as control channel. Once the network allocates all the required resources in a particular transmission time interval (TTI), the network can determine RBs available for contention-based transmission for a TTI as:

CBDT RBs=Total RBs−Scheduled RBs

It should be noted that CBDT resource allocation in dynamic manner may also consider predefined parameters as discussed in reference to fixed manner allocation. In such scenario, allocated CBDT RBs can be calculated as:

Allocated RBs=Total CBDT RBs−Required resource
blocks.

The required resource blocks may depend on the predefined parameters such as number of configured UEs, type of application, priority of UE, signal strength, ratio of ACK/NACK ratio, QoS etc.

It should be noted that in dynamic manner, the CBDT resources are allocated a particular TTI such as TTI1. For next TTI, e.g., TTI2, the network will again calculate the CBDT resources and allocate them to the UEs.

After calculating the resources, the network may also allocate the CBDT resources to the UE. These resources can be either shared with all the UEs or with the set of UEs which can be based on subscription, specific service like IoT, Voice, etc. or priority UEs. Dynamic resources can be valid for some time and then can change which can be based on medium access control (MAC) control element (CE) or downlink control information (DCI) in physical control channel. Thus, there is need to define the procedure so that network can allocate/share these CBDT resources with the UE that will be indicated to the UE and for activation/deactivation of resources.

In an embodiment, the network allocates through broadcast like system information (SI) if these resources are common for all UEs and these resources can be sent to any existing system information message which can be applicable in idle mode or connected mode For example, these resources, can be configured when UE request for specific application say like IoT or voice. The network can also configure the logical channel (LCH) for which these resources are applicable. In an embodiment, a new information element (IE) configuredCBDTGrant-TypeAllowed or any other IE can be used that indicates whether particular logical channel can use these CBDT resources or not. This IE can be present in the LCH configuration or data radio bearers (DRB) configuration.

The network thus can share the CBDT resource blocks with the plurality of user equipment through one of the first grant type and second grant type.

ConfiguredCBDTGrantType1 (first grant type): This grant allows to configure the CBDT resource blocks and activation/deactivation of the CBDT resource blocks using the RRC signalling. In this case once UE receives the configuration, it can only be changed through RRC message. The UE can start using grants once the network has configured it. These can be suitable for application like IoT, etc.

ConfiguredCBDTGrantType 2 (second grant type): This grant type allows to configure the CBDT resource blocks using the RRC signalling and activation/deactivation of the CBDT resource blocks using a physical downlink control channel (PDCCH) signalling. This can also help to change the type of grants or resources. When the UE receives the parameters configured in ConfiguredCBDTGrantType 2, the UE will not immediately perform uplink transmission, The L1 indication in PDCCH can include the configuration and also command to activate/deactivate/change this configuration.

Figure 5:
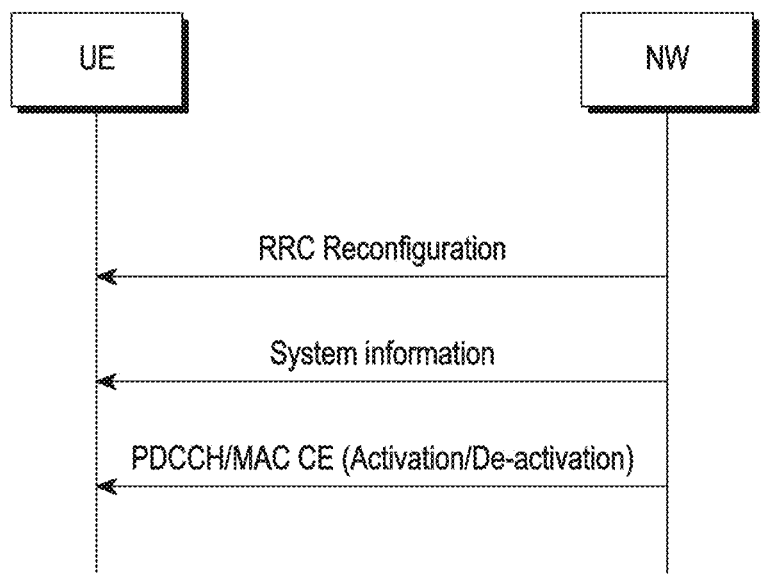
FIG. 5 is a signal flow diagram illustrating example allocation of CBDT resource through RRC message, according to various embodiments.

In case of allocation of CBDT resources in fixed manner, the network may allocate the number of CBDT resource blocks to the plurality of user equipment through a RRC message, as shown in FIG. 5.

In an embodiment, the RRC message may be sent in below format:

```
CBDT-Config or resource setID ::=       SEQUENCE {
   startingdata RB INTEGER (0..maxNrofPhysicalResourceBlocks)
      nrofRBs // Total no of RBs for data
   Starting control RB INTEGER (0..maxNrofPhysicalResourceBlocks)
      nrofRBs // Total no of RBs for control
      periodicity                   ENUMERATED {ms10, ms20,
                                    ms32, ms40, ms64, ms80,
                                    ms128, ms160,
ms320, ms640,
                                    spare6, spare5, spare4,
                                    spare3, spare2, spare1},
      mcs-Table                     ENUMERATED
                                    {qam64LowSE,qam 64, qam
                                    256}  OPTIONAL, -- Need
S
      implicit release              ENUM (e2, e3, .....)
   MAP - CRNTI ID
   Koffset or userdelay or propagation delay   ms // UE need this value
   when it access CBDT resource
   CBDT resource index // This can include MCS table, CQI table index,
   TBS index and other parameters as listed
   above. This is case when NW want the UE to use specific resources only.
}
```

In case of allocation of CBDT resources in fixed manner, the network may allocate the number of CBDT resource blocks to the plurality of user equipment through one of a RRC message, DCI message and a MAC CE message.

After allocation, these resources need to be activated/deactivated based on the network decision or whether UE need these resources or not so that network can use these resources for some other purpose. Moreover, if UE does not need these resources, it can always inform the network to save the battery.

Figure 6:
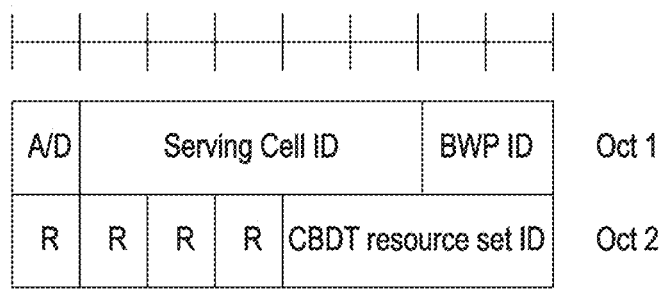
FIG. 6 is a diagram illustrating an example structure for activation/deactivation of CBDT resource, according to various embodiments.

FIG. 6 is a diagram illustrating an example structure for activation/deactivation of CBDT resource, according to various embodiments. In an embodiment, the network may activate and deactivate the configured CBDT resource of a serving Cell by sending the CBDT Resource Set Activation/Deactivation MAC CE. The configured CBDT resource sets are initially deactivated upon configuration and after a handover.

The MAC entity shall:
1> if the MAC entity receives an CBDT Resource Set Activation/Deactivation MAC CE on a Serving Cell:
2> indicate to lower layers the information regarding the CBDT Resource Set Activation/Deactivation MAC CE.

The CBDT Resource Set Activation/Deactivation MAC CE is identified by a MAC sub-header with a logical channel ID (LCID) as specified (any reserved value). It has a fixed size of 16 bits with following fields:

A/D: This field indicates whether to activate or deactivate indicated CBDT resource set. The field is set to 1 to indicate activation, otherwise it indicates deactivation;

Serving Cell ID: This field indicates the identity of the Serving Cell for which the MAC CE applies. The length of the field is 5 bits;

BWP ID: This field indicates a DL BWP for which the MAC CE applies as the codepoint value of the DCI bandwidth part indicator field as specified in TS 38.212. The length of the BWP ID field is 2 bits;

CBDT resource set ID: This field contains an index of CBDT-ResourceSetsToAddModList, as specified in TS 38.331, indicating the CBDT resource set, which shall be activated or deactivated. The length of the field is 4 bits; CBDT resource set includes MCS configuration, periodicity and other IEs that are configured by RRC message R: Reserved bit, set to 0.

The activation and deactivation are also possible through the DCI format of PDCCH where value as "0" signifies deactivation of these resources and "1" signifies activation of these resources. The PDCCH may be scrambled with X-cell radio network temporary identifier (X-CRNTI) which is specific for CBDT resource allocation. New IE "CBDT activation" can be introduced in existing DCI format or new DCI format.

The periodicity can be configured by the network which depends on type of application, sub-carrier spacing, network load, UE subscription, network load etc. The periodicity can be aligned to SR periodicity. There could be error case where UE could not receive the new CBDT due to any error. These CBDT resources will have specific periodicity and are valid for specific time only. Once periodicity timer expires it should release all resource internally and should not access it until it gets new resources. During error cases like radio link failure (RLF), random access channel (RACH) failure, Handover, etc. these resources should be released.

Hence, the network can activate the number of CBDT resource blocks through one of a MAC CE or a layer1 (L1) message and reserve a filed in the header of the MAC CE message or the L1 message bit to indicate the CBDT resource blocks set comprising a modulation and coding scheme (MCS) configuration, periodicity of the CBDT resource blocks and IEs that are configured by the RRC message.

In an embodiment, the network can calculate validity and transmission opportunity of the allotted number of CBDT resource blocks. For example, a validity timer may be configured for the same, or CBDT resource-allocation validity may be linked to SR timer as well.

Each UE has different propagation delay due to its location and distance between satellite and UE when it is served through NTN so the UE cannot use the resources in each TTI due to timing advance issue. The timing advance is derived from the uplink (UL) received timing and sent by the gNB to the UE. The UE uses the timing advance to advance/delay its timings of transmissions to the gNB so as to compensate for propagation delay and thus time align the transmissions from different UEs with the receiver window of the gNB. As the propagation delay is different so it has to do the transmission accordingly.

To address the timing issue, the network can configure multiple parameters like Koffset which can be configured per cell and common for multiple users in a cell. This Koffset may reflect the propagation delay to certain extent and same can be inform to the RRC message or L1 message. The UE specific offset can also be configured by the network, and it will be informed in RRC message like RRC reconfiguration message which can also reflect the propagation delay for each user.

Due to high propagation delay, the UE cannot start using these resources immediately, it has to use these resources after particular time so that it is aligned to gNB as propagation delay is high. In an embodiment, once UE receive the CBDT resources, UE can start using the resources after certain duration which depends on Koffset or UE specific offset. Moreover, these resources can be valid for certain duration only and UE can access within those time limits.

For example, the CBDT grant received in TTI#(X) would only be valid from TTI# (X+K2-delay-in-TTIs) to TTI# {X+SR-period+K2-delay-in-TTIs−1}, where K2-delay can be replaced by UE specific delay or Koffset, SR period or any other CBDT specific period can be configured by RRC message.

The CBDT grant received in Slot#(N) would only be valid from Slot# (N+K2-delay-in-slots) to Slot# {N+SR-period+K2-delay-in-slots−1}, where K2-delay can be replaced by UE specific delay or Koffset, SR period or any other CBDT specific period can be configured by RRC message.

Another possibility is that CBDT grant received in Symbol#(N) would only be valid from Symbol # (N+K2-delay-in-slots) to Symbol # {N+SR-period+K2-delay-in-symbol−1}, where K2-delay can be replaced by UE specific delay or Koffset, SR period or any other CBDT specific period can be configured by RRC message.

In this case once the network allocates the CBDT resources, the UE has to take care of UE transmission by considering the propagation delay and accordingly use these resources. Once UE receives these resources through RRC message and it's activated then for then UE can start using these resources as per data arrived and if logical channel is valid to use these resources.

Figure 7:
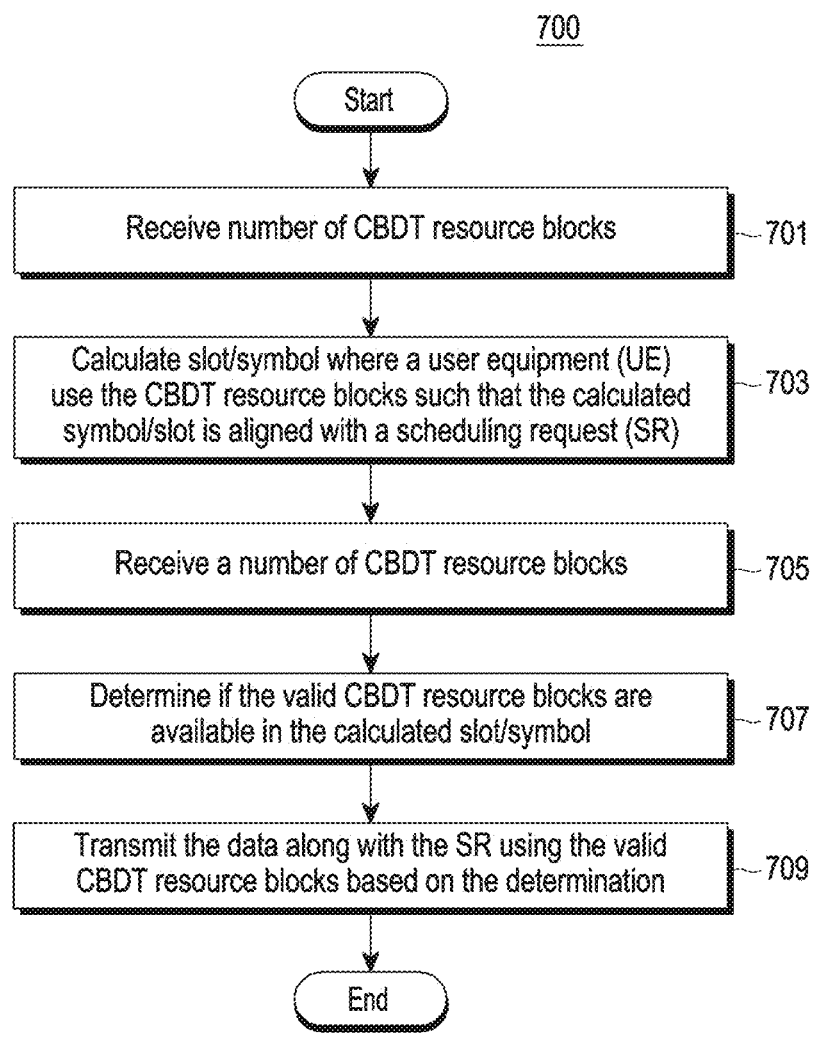
FIG. 7 is a flowchart illustrating an example method for transmitting data using contention based data transmission (CBDT) resource blocks in a non-terrestrial network (NTN), according to various embodiments.

FIG. 7 is a flowchart illustrating an example method for transmitting data using CBDT resource blocks in a NTN, according to various embodiments. As shown in FIG. 7, at operation 701, the method includes receiving a number of CBDT resource blocks. At operation 703, the method 700 may include calculating a slot/symbol where a UE use the CBDT resource blocks such that the calculated symbol/slot is aligned with a SR. In an embodiment, the slot/symbol may be calculated based on propagation delay, e.g., Koffset or UE specific offset. For example, the UE can calculate the symbol or slot or frame where it can use these resources by considering propagation delay as below.

After an uplink grant is configured for a configured grant Type 1, the MAC entity shall consider sequentially that the Nth (N>=0) uplink grant occurs in the symbol for which:

[(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame×numberOfSymbolsPerSlot+timeDomainOffset×numberOfSymbolsPerSlot+S+N×periodicity) modulo (1024×numberOfSlotsPerFrame×numberOfSymbolsPerSlot)+Koffset or UE_uplink_Delay.

where SFN start time, slotstart time, and symbol start time are the SFN, slot, and symbol, respectively, of the first transmission opportunity of physical uplink shared channel (PUSCH) where the configured uplink grant was (re-)initialised.

Another aspect is when UE receives the CBDT resources through DCI or MAC CE. Once UE receives the CBDT resources through physical control channel which can be decoded CBDT specific C-RNTI which can be configured by the network. These grants will be valid till specific frame, slots and symbols which can be calculated as below.

After an uplink grant is configured for a configured CBDT grant Type 2 or received the grants through DCI, the MAC entity shall consider sequentially that the Nth (N>=0) uplink grant occurs in the symbol till it is valid as mentioned above for which:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo (1024×numberOfSlotsPerFrame×numberOfSymbolsPerSlot)+Koffset or UE_uplink_Delay.

where SFNstart time, slotstart time, and symbolstart time are the SFN, slot, and symbol, respectively, of the first transmission opportunity of PUSCH where the configured uplink grant was (re-)initialised.

Figure 8:
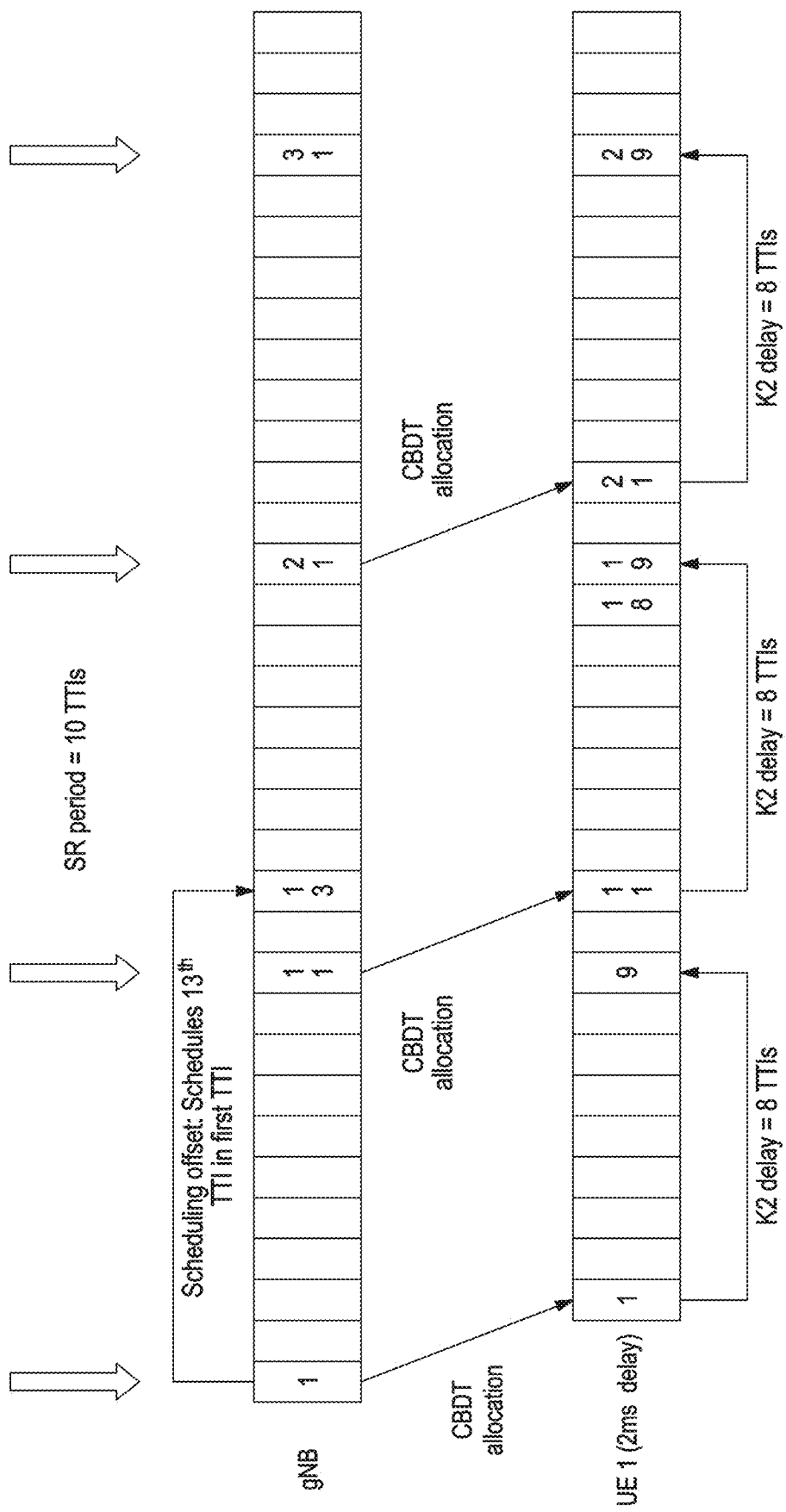
FIG. 8 is a diagram illustrating example accessing of the CBDT resources, according to various embodiments.

Referring back to FIG. 7, at operation 705, the method 700 may include accessing the CBDT resource blocks that are valid in the calculated slot/symbol. In an embodiment, the CBDT resource blocks can be accessed after a predetermined offset value/scheduling offset. FIG. 8 is a diagram illustrating example accessing of the CBDT resources, according to various embodiments. In an embodiment, the scheduling-offset is 12 TTIs, and SR periodicity is 10 TTIs.

In terrestrial network (TN) the timing advance is less than microsecond within cell as propagation delay is almost 0, so scheduling offset is same for all the UEs and resources which are allocated, once received by the UE can be immediately used in next available uplink slot. In case of NTN, UEs when served with satellite will have different propagation delay (8 ms to 25.77 ms) within cell depending on UE position and gNB position. The scheduling offset is defined as 2*propagation-delay+processing-delay. In case of TN as propagation delay is zero so scheduling offset is set only by considering processing delay only.

The scheduling offset defines the time period in slots or TTI for the uplink grants e.g., the network should allocate the grants to use in TTI#X in TTI#X-delta, where delta depends on propagation delays and processing delay.

In NTN, the scheduling offset is set as per highest propagation delay as multiple UEs within cell has different propagation delay. The scheduling offset for worst-case user (4 ms user) as 2*propagation-delay+processing-delay (4 ms)=12 TTIs. This is minimum time required to process any grants e.g., from allocation of grants to the UE send the data to the network. K2 delay is the delay (in unit of slots) between an uplink grant reception and the corresponding uplink data transmission. K2 delay will be varied depending on propagation delay. For a UE with 2 ms propagation delay, K2 delay would be 8 TTIs, considering scheduling offset as 12 and periodicity as 10 ms result as shown in FIG. 6. The RB map received in TTI#1 at UE would be valid from TTI#9 to TTI#18 and The CBDT RB map received in TTI#11 would be valid from TTI#19 to TTI#28. The validity of grants depends on SR periodicity and K2 delay which will further depends on propagation delay. The network should indicate this value in RRC message. This K2 delay is same as K_offset or user specific delay.

Similarly for a UE with 4 ms propagation delay, K2 delay would be 4 TTIs, and

The RB map received in TTI#1 at UE would be valid from TTI#5 to TTI#15 and The CBDT RB map received in TTI#11 would be valid from TTI#15 to TTI#24.

All resources will be valid for specific period only and no of TTI/slots depends upon propagation delay. UE need to calculate this value based on K2 value. The network can share this K2 value or Kx value on DCI or in RRC message. This can be dynamic parameter which can be changed based on UE location and scheduling offset.

The CBDT grant received in TTI#(X) would only be valid from TTI# (X+K2-delay-in-TTIs) to TTI# {X+SR-period+K2-delay-in-TTIs−1}.

Referring back to FIG. 7, at operation 707, the method may include determining if the valid CBDT resource blocks are available in the calculated slot/symbol. At operation 709, the method may include transmitting the data along with the SR using the valid CBDT resource blocks based on the determination. However, if the valid CBDT resource blocks are not available in the calculated slot/symbol, then only SR is transmitted.

Figure 9:
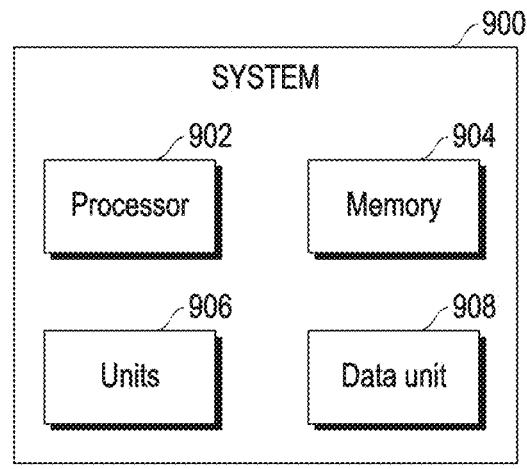
FIG. 9 is a block diagram illustrating an example configuration of a system for allocation of contention based data transmission (CBDT) resource blocks in a non-terrestrial network (NTN), according to various embodiments.

FIG. 9 is a block diagram illustrating an example configuration of a system 900 for allocation of CBDT resource blocks in a NTN, according to various embodiments. It should be noted that the system 900 may be a part of a network/base station. In an embodiment, the system 900 may be connected to the network/base station. The system 900 may include, but is not limited to, a processor (e.g., including processing circuitry) 902, memory 904, units 906, and data unit 908. The units 906 and the memory 904 may be coupled to the processor 902. The system 900 may be configured to perform methods as described in detail above with reference to FIGS. 4-6.

Figure 10:
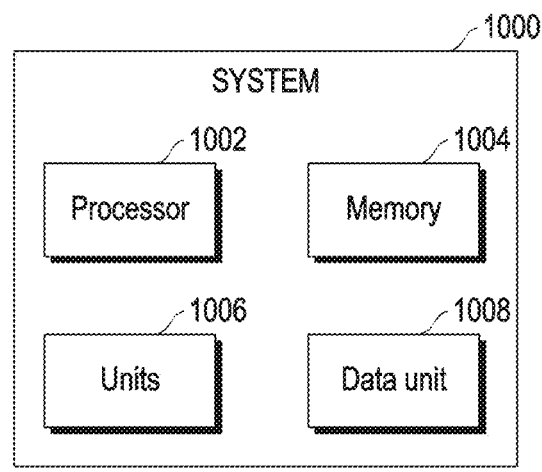
FIG. 10 is a block diagram illustrating an example configuration of a system for transmitting data using contention based data transmission (CBDT) resource blocks in a non-terrestrial network (NTN), according to various embodiments.

FIG. 10 is a block diagram illustrating an example configuration of a system 1000 for transmitting data using CBDT resource blocks in a NTN, according to various embodiments. It should be noted that the system 1000 may be a part of a UE. In an embodiment, the system 1000 may be connected to the UE. The system 1000 may include, but is not limited to, a processor (e.g., including processing circuitry) 1002, memory 1004, units 1006, and data unit 1008. The units 1006 and the memory 1004 may be coupled to the processor 1002. The system 1000 may be configured to perform methods as described in detail above with reference to FIGS. 7-8.

The processors 902, 1002 can be a single processing unit or several units, all of which could include multiple computing units. The processors 902, 1002 may be implemented as one or more microprocessors, microcomputers, microcontrollers, digital signal processors, central processing units, state machines, logic circuitries, and/or any devices that manipulate signals based on operational instructions. Among other capabilities, the processors 902, 1002 are configured to fetch and execute computer-readable instructions and data stored in the memory 904, 1004, respectively.

The memory 904, 1004 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 906, 1006 amongst other things, include routines, programs, objects, components, data structures, etc., which perform particular tasks or implement data types. The units 906, 1006 may also be implemented as, signal processor(s), state machine(s), logic circuitries, and/or any other device or component that manipulate signals based on operational instructions.

Further, the units 906, 1006 can be implemented in hardware, instructions executed by a processing unit, or by a combination thereof. The processing unit can comprise a computer, a processor, such as the processor 902, 1002, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the present disclosure, the units 906, 1006 may be machine-readable instructions (software) which, when executed by a processor/processing unit, perform any of the described functionalities.

The data units 908, 1008 serve, amongst other things, as a repository for storing data processed, received, and generated by one or more of the units 906, 1006, respectively.

Thus, the present disclosure provides more efficient CBDT resource allocation.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for allocation of contention-based data transmission (CBDT) resource blocks in a non-terrestrial network (NTN), comprising:
   determining, by a network, that the CBDT resource blocks are to be configured for allocation to a plurality of user equipments (UEs) based on two or more of a plurality of parameters including a UE traffic model, latency, quality of service (QOS) requirements, processing capability at a gnodeB (gNB), and a load at the gnodeB (gNB);
   determining, by the network, that a fixed number of CBDT resource blocks from the CBDT resource blocks determined to be used for the allocation to the plurality of UEs based on at least one of the plurality of parameters; and
   allocating, by the network, a number of CBDT resource blocks in one of a fixed manner or a dynamic manner, wherein the number of CBDT resource blocks are allocated in the fixed manner based on the fixed numbers of CBDT resource blocks being used for the allocation to the plurality of UEs, and the number of CBDT resource blocks are allocated in the dynamic manner based on the fixed numbers of CBDT resource blocks not being used for the allocation to the plurality of UEs,
   wherein allocating the number of CBDT resource blocks in the fixed manner comprises calculating the number of CBDT resource blocks based on a type of application used by each of the plurality of UEs and a ratio of acknowledgement/non-acknowledgement (ACK/NACK) of previously allocated resource blocks to the plurality of UEs.

2. The method as claimed in claim 1, wherein allocating the number of CBDT resource blocks in the fixed manner comprises:
   calculating the number of CBDT resource blocks based on at least one of a plurality of specified parameters, wherein the plurality of specified parameters includes the plurality of UEs configured with the NTN, utilization of resource blocks by the plurality of UE, a signal strength of the plurality of UEs and a quality of service (QOS) of the plurality of UEs; and
   allocating the number of CBDT resource blocks to the plurality of UEs through a radio resource control (RRC) message.

3. The method as claimed in claim 1, wherein allocating the number of CBDT resource blocks in the dynamic manner comprises:
   calculating the number of CBDT resource blocks based on a total number of resource blocks and scheduled resource blocks, wherein the scheduled resource blocks include dedicated resource blocks, common resource blocks and shared resource blocks for configured and control channel; and
   allocating the number of CBDT resource blocks to the plurality of UEs through one of a radio resource control (RRC) message, downlink control information (DCI) message and a medium access control (MAC) control element (CE) message for a transmission time interval (TTI).

4. The method as claimed in claim 1, further comprising:
   activating the number of CBDT resource blocks through one of a medium access control (MAC) control element (CE) or a layer1 (L1) message; and
   calculating validity and transmission opportunity of the allotted number of CBDT resource blocks.

5. The method as claimed in claim 4, wherein activating the number of CBDT resource blocks comprises:
   reserving a bit in a header of the MAC CE message or the L1 message to indicate activation of the number of CBDT resource blocks; and
   reserving a field in the header of the MAC CE message or the L1 message bit to indicate the CBDT resource blocks set including a modulation and coding scheme (MCS) configuration, periodicity of the CBDT resource blocks and information elements (IEs) that are configured by a radio resource control (RRC) message.

6. The method as claimed in claim 1, further comprising:
   sharing the CBDT resource blocks with the plurality of UEs through one of a first grant type and a second grant type, wherein the first grant type allows configuring the CBDT resource blocks and activation/deactivation of the CBDT resource blocks using a radio resource control (RRC) signaling and the second grant type allows configuring the CBDT resource blocks using the RRC signaling and the activation/deactivation of the CBDT resource blocks using a physical downlink control channel (PDCCH) signaling.

7. A method for transmitting data using contention-based data transmission (CBDT) resource blocks in a non-terrestrial network (NTN), comprising:
   receiving, by a user equipment (UE), a number of CBDT resource blocks with a valid timing window;
   calculating, by the UE, a slot/symbol where the UE uses the number of CBDT resource blocks, where the calculated symbol/slot is aligned with a scheduling request (SR);
   determining, by the UE, that one or more the CBDT resource blocks in the calculated slot/symbol are within the valid timing window;
   determining, by the UE, that the one or more CBDT resource blocks within the valid timing window are available for contention-based transmission in the calculated slot/symbol; and
   transmitting, by the UE, the data along with the SR using the one or more CBDT resource blocks within the valid timing window based on the determining that the one or more CBDT resource blocks are available for contention-based transmission in the calculated slot/symbol,
   wherein the number of CBDT resource blocks is allocated in one of a fixed manner based on a fixed number of CBDT resource blocks being used for an allocation to a plurality of UEs, or a dynamic manner based on the fixed number of CBDT resource blocks not being used for the allocation to the plurality of UEs, and
   wherein the number of CBDT resource blocks is calculated based on a type of application used by each of the plurality of UEs and a ratio of acknowledgement/non-acknowledgement (ACK/NACK) of previously allocated resource blocks to the plurality of UEs.

8. The method as claimed in claim 7, wherein accessing the CBDT resource blocks comprises accessing the CBDT resource blocks after a specified offset value.

9. The method as claimed in claim 7, further comprising:
   transmitting the SR based on the valid CBDT resource blocks not being available in the calculated slot/symbol.

10. A system for allocation of contention-based data transmission (CBDT) resource blocks in a non-terrestrial network (NTN), comprising:
    at least one processor including processing circuitry; and
    a memory storing instructions, wherein the instructions, when executed by the at least one processor individually and/or collectively, cause the at least one processor to:
    determine that the CBDT resource blocks are to be configured for allocation to a plurality of user equipments (UEs) based on two or more of a plurality of parameters including a UE traffic model, latency, quality of service (Qos) requirements, processing capability at a gnodeB (gNB), and a load at the gnodeB (gNB);
    determine that a fixed number of CBDT resource blocks from the CBDT resource blocks determined to be configured are to be used for the allocation to the plurality of UEs based on at least one of the plurality of parameters; and
    allocate a number of CBDT resource blocks in one of a fixed manner or a dynamic manner, wherein the number of CBDT resource blocks are allocated in the fixed manner, based on the fixed numbers of CBDT resource blocks being used for the allocation to the plurality of UEs, and the number of CBDT resource blocks are allocated in the dynamic manner based on the fixed numbers of CBDT resource blocks not being used for the allocation to the plurality of UEs,
    wherein allocating the number of CBDT resource blocks in the fixed manner comprises calculating the number of CBDT resource blocks based on a type of application used by each of the plurality of UEs and a ratio of acknowledgement/non-acknowledgement (ACK/NACK) of previously allocated resource blocks to the plurality of UEs.

11. The system as claimed in claim 10, wherein for allocating the number of CBDT resource blocks in the fixed manner, the processor is configured to:
calculate the number of CBDT resource blocks based on at least one of a plurality of specified parameters, wherein the plurality of specified parameters include the plurality of UEs configured with the NTN, utilization of resource blocks by the plurality of UEs, a signal strength of the plurality of UEs and a quality of service (QOS) of the plurality of UEs; and
allocate the number of CBDT resource blocks to the plurality of UEs through a radio resource control (RRC) message.

12. The system as claimed in claim 10, wherein for allocating the number of CBDT resource blocks in the dynamic manner, the processor \is configured to:
calculate the number of CBDT resource blocks based on a total number of resource blocks and scheduled resource blocks, wherein the scheduled resource blocks include dedicated resource blocks, common resource blocks and shared resource blocks for configured and control channel; and
allocate the number of CBDT resource blocks to the plurality of UEs through one of a radio resource control (RRC) message, downlink control information (DCI) message and a medium access control (MAC) control element (CE) message for a transmission time interval (TTI).

13. The system as claimed in claim 10, wherein the processor is further configured to:
activate the number of CBDT resource blocks through one of a medium access control (MAC) control element (CE) or a layer1 (L1) message; and
calculate validity and transmission opportunity of the allotted number of CBDT resource blocks.

14. The system as claimed in claim 13, wherein for activating the number of CBDT resource blocks, the processor is configured to:
reserve a bit in a header of the MAC CE message or the L1 message to indicate activation of the number of CBDT resource blocks; and
reserve a field in the header of the MAC CE message or the L1 message bit to indicate the CBDT resource blocks set including a modulation and coding scheme (MCS) configuration, periodicity of the CBDT resource blocks and information elements (IEs) that are configured by a radio resource control (RRC) message.

15. The system as claimed in claim 10, wherein the processor is further configured to:
share the CBDT resource blocks with the plurality of UEs through one of a first grant type and a second grant type, wherein the first grant type allows configuring the CBDT resource blocks and activation/deactivation of the CBDT resource blocks using a radio resource control (RRC) signaling and the second grant type allows configuring the CBDT resource blocks using the RRC signaling and activation/deactivation of the CBDT resource blocks using a physical downlink control channel (PDCCH) signaling.

16. A user equipment (UE) for transmitting data using contention-based data transmission (CBDT) resource blocks in a non-terrestrial network (NTN), comprising:
at least one processor including processing circuitry; and
a memory storing instructions, wherein the instructions, when executed by the at least one processor individually and/or collectively, cause the at least one processor to:
receive a number of CBDT resource blocks with a valid timing window;
calculate a slot/symbol where the UE uses the number of CBDT resource blocks, where the calculated symbol/slot is aligned with a scheduling request (SR);
determine that one or more the CBDT resource blocks in the calculated slot/symbol are within the valid timing window;
determine that the one or more CBDT resource blocks within the valid timing window are available for contention-based transmission in the calculated slot/symbol; and
transmit the data along with the SR using the one or more CBDT resource blocks within the valid timing window based on the determining that the one or more CBDT resource blocks are available for contention-based transmission in the calculated slot/symbol,
wherein the number of CBDT resource blocks is allocated in one of a fixed manner based on a fixed number of CBDT resource blocks being used for an allocation to a plurality of UEs, or a dynamic manner based on the fixed number of CBDT resource blocks not being used for the allocation to the plurality of UEs,
wherein the number of CBDT resource blocks is calculated based on a type of application used by each of the plurality of UEs and a ratio of acknowledgement/non-acknowledgement (ACK/NACK) of previously allocated resource blocks to the plurality of UEs.

17. The UE as claimed in claim 16, wherein the processor is configured to access the CBDT resource blocks after a specified offset value.

18. The UE as claimed in claim 16, wherein the processor is further configured to:
transmit the SR based on the valid CBDT resource blocks not being available in the calculated slot/symbol.

* * * * *